United States Patent
Baker et al.

(10) Patent No.: US 7,916,856 B2
(45) Date of Patent: Mar. 29, 2011

(54) DIALING PLAN INFORMATION AS PROVIDED TO A TELECOMMUNICATIONS ENDPOINT

(75) Inventors: Albert J Baker, Eatontown, NJ (US); Pankaj Omprakash Agrawal, Broomfield, CO (US); Glen George Freundlich, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 1331 days.

(21) Appl. No.: 11/422,569

(22) Filed: Jun. 6, 2006

(65) Prior Publication Data

US 2007/0280469 A1   Dec. 6, 2007

(51) Int. Cl.
*H04M 7/00* (2006.01)
(52) U.S. Cl. .......... 379/221.14; 379/201.01; 707/664
(58) Field of Classification Search .......... 379/221.14, 379/201.01; 455/414.1; 707/102, 609–686
See application file for complete search history.

(56) References Cited

U.S. PATENT DOCUMENTS

| | | | |
|---|---|---|---|
| 6,373,817 B1 * | 4/2002 | Kung et al. | 370/217 |
| 6,490,345 B2 | 12/2002 | Fleischer, III et al. | |
| 6,636,594 B1 | 10/2003 | Oran | |
| 6,983,159 B2 * | 1/2006 | Di Pasquale et al. | 455/461 |
| 7,146,158 B2 * | 12/2006 | Belkin et al. | 455/414.1 |
| 7,346,635 B2 * | 3/2008 | Whitten et al. | 707/204 |
| 2006/0198312 A1 * | 9/2006 | Schondelmayer et al. | 370/241 |

FOREIGN PATENT DOCUMENTS

EP   494530 A2 * 7/1992
EP   948217 A2 * 10/1999

* cited by examiner

*Primary Examiner* — Ahmad F Matar
*Assistant Examiner* — Oleg Asanbayev
(74) *Attorney, Agent, or Firm* — DeMont & Breyer, LLC

(57) ABSTRACT

A technique is disclosed for receiving call-control data, often from a variety of sources; processing the data into a format, content, and size that is appropriate for a telecommunications endpoint; and transmitting the processed call-control data to the endpoint. The personal profile manager of the illustrative embodiment is what first acquires the call-control data, which includes a dialing plan. The manager also reformats the call-control data and deletes redundant data. Subsequently, when a request is received from an endpoint, the personal profile manager further processes the call-control data and then transmits, to the requesting endpoint, the portion of the processed data that is appropriate for the endpoint. Transmitting the call-control data to the endpoint offloads some of the processing from the supporting call-processing server, as the data that constitute call-control rules that are used by the endpoint to make call-control decisions.

19 Claims, 6 Drawing Sheets

DIALING PLAN INFORMATION AS PROVIDED TO A TELECOMMUNICATIONS ENDPOINT

FIELD OF THE INVENTION

The present invention relates to telecommunications in general, and, more particularly, to aggregating, transforming, selecting, and reducing data into a dialing plan.

BACKGROUND OF THE INVENTION

When a telephone call is made from a telephone by its user, the telephone signals a call-processing switch, or similar equipment such as a server, that a request is being made to set up the call. The call-processing switch handles the request, which comprises dialing information that includes the dialed digits of the called telephone number; historically, the switch detected and analyzed each digit as it was dialed. Although the telephone participates in the call-setup process, it is the call-processing switch that has typically performed the majority of the call-setup processing between the two devices.

Plain Old Telephone Service (or "POTS") telephones have evolved into intelligent, telecommunications endpoint devices. These endpoints support more high-level signaling, such as the Session Initiation Protocol (or "SIP") and H.323 protocol, to initiate calls or to activate features—in contrast to the low-level, stimulus-based signaling that is traditionally associated with POTS telephony. These smarter endpoints can even establish calls with limited, if any, assistance from a call-processing server. To establish calls, when working with a server such as an Internet Protocol-based, private branch exchange (IP-PBX), the endpoint device stores certain aspects of the server's configuration, such as the "dialing plan."

The term "dialing plan," and its inflected forms, is defined for use in this Specification, including the appended claims, as a call-control scheme that establishes the expected pattern and number of digits for a telephone number. This includes country codes, access codes, area codes, and various combinations of digits dialed. For instance, the North American Public Switched Telephone Network (PSTN) uses a 10-digit dialing plan that includes a 3-digit area code and a 7-digit telephone number. Most private branch exchanges (PBX) support variable-length dialing plan plans that use 3 to 11 digits that may be preceded by a "9" if required to access an outside line. A dialing plan comprises at least one alphanumeric string that represents at least a part of a call-control rule. A dialing plan is also referred to as a "dial plan" or "dialplan."

Dialing plans aside, as the telecommunications endpoints continue to evolve, so do the demands on the network for new features, both on the endpoints and on the call-processing servers. The call-processing servers also have to deal with the trend of increased mobility, in which each telecommunications system user is often able to log in to multiple endpoints and where each endpoint can be used by multiple users at various times.

SUMMARY OF THE INVENTION

The present invention is a technique for receiving call-control data, often from a variety of sources; processing the data into a format, content, and size that is appropriate for a telecommunications endpoint; and transmitting the processed call-control data to the endpoint. The personal profile manager of the illustrative embodiment is what first acquires the call-control data, which includes a dialing plan. The manager also reformats the call-control data and deletes redundant data. Subsequently, when a request is received from an endpoint, the personal profile manager further processes the call-control data and then transmits, to the requesting endpoint, the portion of the processed data that is appropriate for the endpoint.

The personal profile manager of the illustrative embodiment aggregates alphanumeric, call-control strings from various sources. It then reformats one or more of the received strings into a format that is readable by the client telecommunications endpoints. The personal profile manager then filters the set of reformatted strings by deleting one or more strings from the set, based on how closely each string that is a candidate for deletion matches one or more of the other strings. This "near-match" reduction serves to eliminate strings that have become redundant, as the same or similar string might have been received from two different sources. This can occur, for example, where the reformatted strings include strings for implementing least-cost routing based on the dialed digits, but where a more general string already describes the associated dialing rule sufficiently enough for the endpoints to use.

When the personal profile manager receives a request from a telecommunications endpoint, the manager selects a subset of strings from the set of non-deleted strings generated earlier, where the specific subset is endpoint-dependent. In some alternative embodiments, the specific subset can also be user-dependent. The manager then reduces the number of strings in the subset of selected strings, based on a predetermined size limit. In some alternative embodiments, the reduction is instead based on the storage capacity of the requesting telecommunications endpoint. One of two possible reduction algorithms is applied to the set, to get the number of final strings below the limit. The first algorithm is a truncation in which the manager removes all strings after the maximum allowable number of strings. The second algorithm is referred to as a "vertical truncation," which considers both the length of each string and the total number of strings. The result of the reduction is a set of reduced strings that is specific to the endpoint.

Transmitting the set of reduced strings to the telecommunications endpoint can offload at least some of the processing from the supporting call-processing server, as the strings constitute call-control rules that are used by the endpoint to make call-control decisions. This enables both the endpoints and the call-processing server or servers to deal with demands for new features better than with some techniques in the prior art, as the servers' resources can be reallocated to handle the new features. The telecommunications system of the illustrative embodiment is also able to deal with the trend of increased mobility by comprising a technique for enabling a given endpoint to handle different users with different calling patterns and preferences.

The illustrative embodiment of the present invention comprises: receiving a first plurality of alphanumeric strings that constitute call-control rules; deleting at least a first string from a second plurality of strings derived from the first plurality, based on how closely the first string matches one or more other strings from the plurality, wherein the deletion results in a set of non-deleted strings; and selecting, from the set of non-deleted strings, a first subset of strings intended for a first telecommunications endpoint, wherein the selection is based on the location of the first telecommunications endpoint, and wherein the first subset comprises dialing plan information.

DETAILED DESCRIPTION

Figure 1:
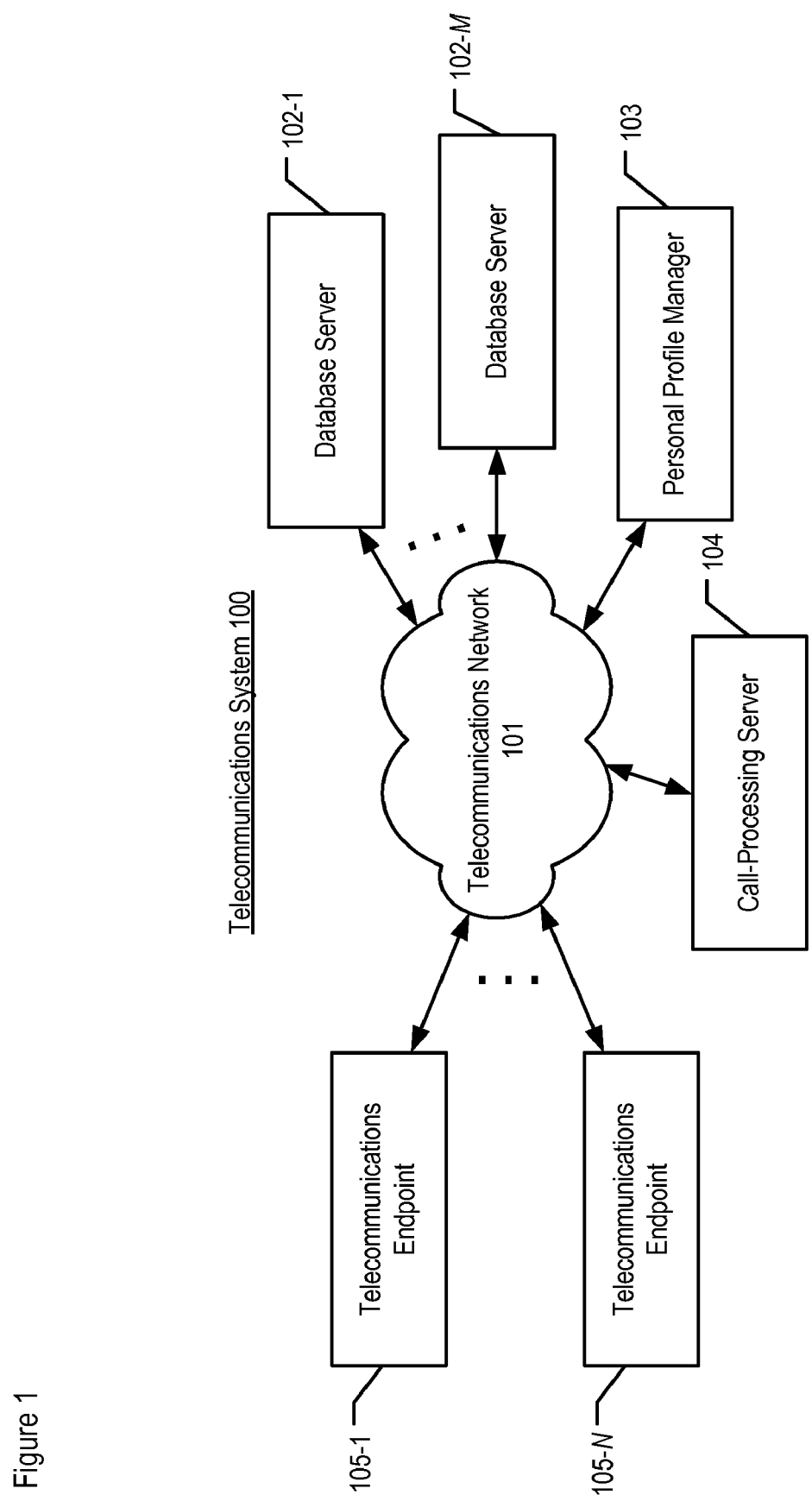
FIG. 1 depicts telecommunications system 100 in accordance with the illustrative embodiment of the present invention.

FIG. 1 depicts telecommunications system 100 in accordance with the illustrative embodiment of the present invention. Telecommunications system 100 comprises telecommunications network 101; call-control database servers 102-1 through 102-M, wherein M is a positive integer; personal profile manager 103; call-processing server 104; and telecommunications endpoints 105-1 through 105-N, wherein N is a positive integer, interconnected as shown. Telecommunications system 100 is capable of the switching and transmission of media signals (e.g., voice, audio, video, etc.) and call-control signals, as are well-known in the art.

Telecommunications network 101 is a telecommunications network that comprises one or more of the Internet, the Public Switched Telephone Network (PSTN), a local area network (LAN), and so forth. Network 101 comprises or is connected to one or more transmission-related nodes such as gateways, routers, or switches that are used to direct data packets from one or more sources to the correct destinations of those packets. Network 101 is capable of handling, in well-known fashion, Internet Protocol-based messages that are transmitted among two or more Internet Protocol-capable processing systems such as between call-control database servers 102-1 through 102-M and personal profile manager 103, between manager 103 and endpoints 105-1 through 105-N, and so forth.

Call-control database server 102-$m$, for m=1 through M, is a data-processing system that fulfills database access requests from its users. Each database server is capable of acquiring and maintaining call-control rules, such as dialing plan information and least-cost routing information, in well-known fashion. In some embodiments, each database server stores a different set of call-control rules; for example, server 102-1 might store dialing plan information, while server 102-2 stores least-cost routing information, server 102-3 stores other call-control rules, and so forth. It will be clear to those skilled in the art how to make and use call-control database servers 102-1 through 102-M.

Personal profile manager 103 is a server data-processing system that fulfills profile access requests from its telecommunications endpoint users, and is depicted in additional detail below and with respect to FIG. 3. Profile manager 103 is also capable of accessing database servers 102-1 through 102-M for the purpose of acquiring one or more call-control rules that are in the form of alphanumeric strings. In the illustrative embodiment, profile manager 103 operates in accordance with the Internet Protocol for the purpose of transmitting and receiving information. In some alternative embodiments, as those who are skilled in the art will appreciate, profile manager 103 can operate in accordance with a different protocol.

In accordance with the illustrative embodiment, personal profile manager 103 aggregates, reformats, filters, selects, and reduces alphanumeric call-control strings that it receives from one or more sources. The details of this process are described below and with respect to FIGS. 4 through 6. As those who are skilled in the art will appreciate, the functionality described in this specification with respect to personal profile manager 103 can alternatively be implemented in a data-processing system that is other than a server. In any event, it will be clear to those who are skilled in the art, after reading this specification, how to make and use personal profile manager 103.

Call-processing server 104 is a data-processing system that fulfills call-processing requests from its telecommunications endpoint users, as well as from other users. For example, server 104 is capable of reading in and analyzing the dialed digits from telecommunications endpoint 105-$n$, and well as processing the corresponding call-setup request. In some alternative embodiments, call-processing server 104 is also capable of receiving, from personal profile manager 103, updated call-control rules that server 104 uses to set up calls. In some other alternative embodiments, server 104 is capable of providing call-control rules to personal profile manager 103. Although a single call-processing server is depicted, it will be clear to those skilled in the art, after reading this specification, how to make and use alternative embodiments of the present invention with multiple call-processing servers present. In any event, it will be clear to those skilled in the art how to make and use call-processing server 104.

Telecommunications endpoint 105-$n$, for n=1 through N, is a communications device such as an Internet Protocol-based endpoint, a Session Initiation Protocol-based (SIP-based) endpoint, and an H.323 endpoint, and can be in a variety of forms such as a standalone telephone, a notebook computer, a personal digital assistant (PDA), a tablet computer, and so forth. The endpoints are capable of originating outgoing calls and receiving incoming calls, as well as downloading one or more call-control rules, such as dialing plan strings, in well-known fashion. In addition, each endpoint is capable of one or more communication modes that comprise, but are not limited to voice, audio, video, data, email, instant messaging, and chat. It will be clear to those skilled in the art how to make and use telecommunications endpoint 105-1 through 105-N.

Figure 2:
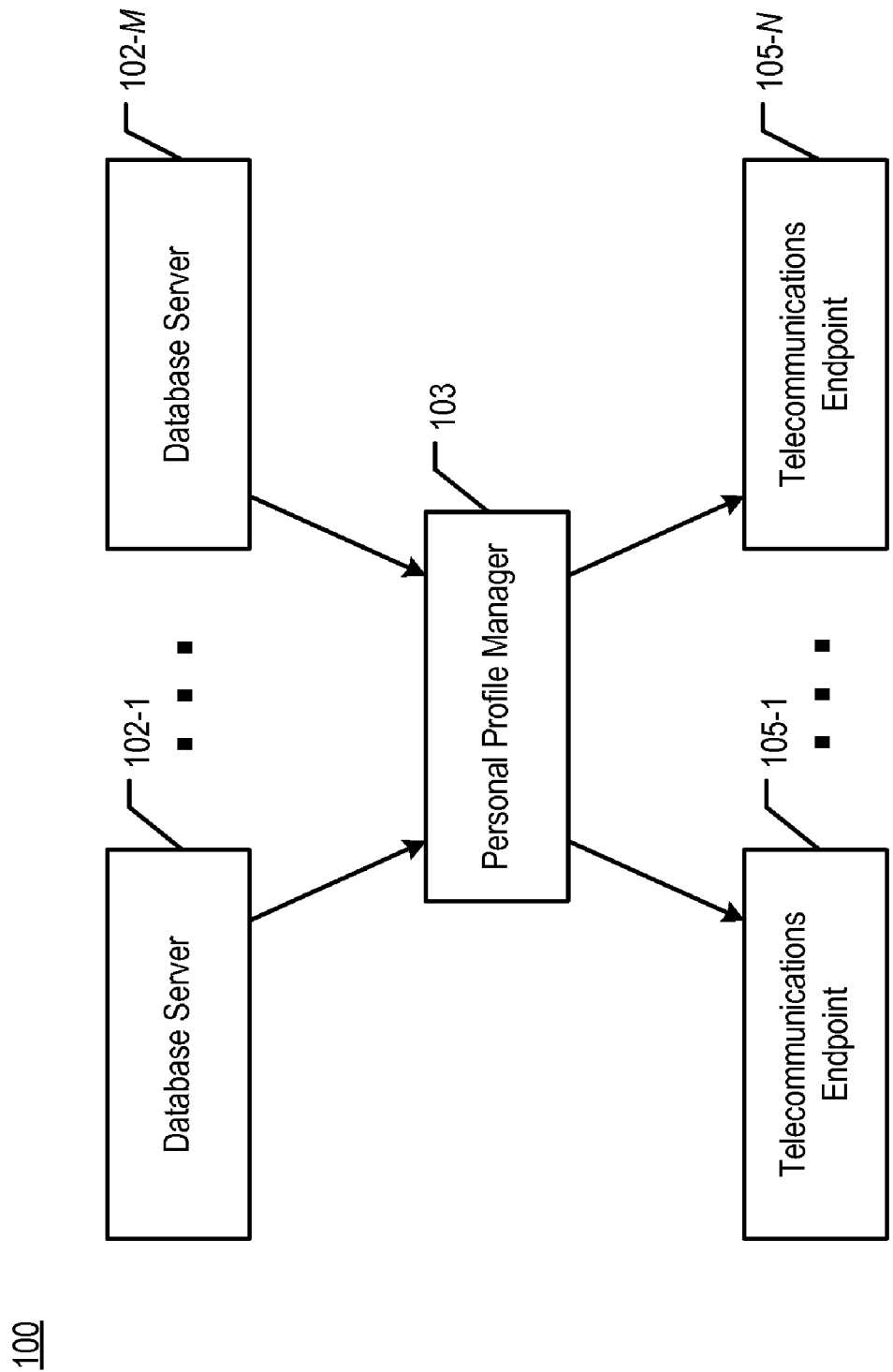
FIG. 2 depicts the logical relationship among database servers 102-1 through 102-M, personal profile manager 103, and telecommunications endpoints 105-1 through 105-N, in accordance with the illustrative embodiment of the present invention.

FIG. 2 depicts the logical relationship among database servers 102-1 through 102-M, personal profile manager 103, and telecommunications endpoints 105-1 through 105-N, in accordance with the illustrative embodiment of the present invention. Manager 103 is an information aggregator that acquires data from a plurality sources, such as database servers 102-1 through 102-M. In accordance with the illustrative embodiment, manager 103 first requests the data that it subsequently receives. As those who are skilled in the art will appreciate, in some alternative embodiments, manager 103 can spontaneously receive the data from the database servers without having first requested the data. Manager 103 obtains dialing plan data, as well as other data related to call-control (e.g., least-cost routing data, etc.), from the source database servers. Manager 103 can also obtain data that covers an aspect of the dialing plan that is unique to a subset of telecommunications system 100's endpoints or users—for example, where the telephone numbers for local resources for a company are different for a branch office in Chicago than for a branch office in London. Manager 103 then reformats the data into the format that is specified for the server-to-client interface—that is, from manager 103 to one or more client endpoints 105-1 through 105-N.

After further processing the received call-control rules, as described below and with respect to FIGS. 4 through 6, manager 103 transmits the rules, which comprise a portion of a dialing plan, to one or more of telecommunications endpoints 105-1 through 105-N. In accordance with the illustrative embodiment, manager 103 transmits the rules to a particular endpoint based on having received a request from an endpoint—for example, through a user login procedure performed by a user at the endpoint. Manager 103 is capable of receiving requests from different endpoints and is further capable of receiving different requests from the same endpoint, such as when a first user utilizes a first endpoint in the morning and a second user utilizes the same endpoint in the afternoon. In some alternative embodiments, manager 103 spontaneously transmits the call-control rules to one or more telecommunications endpoints.

Figure 3:
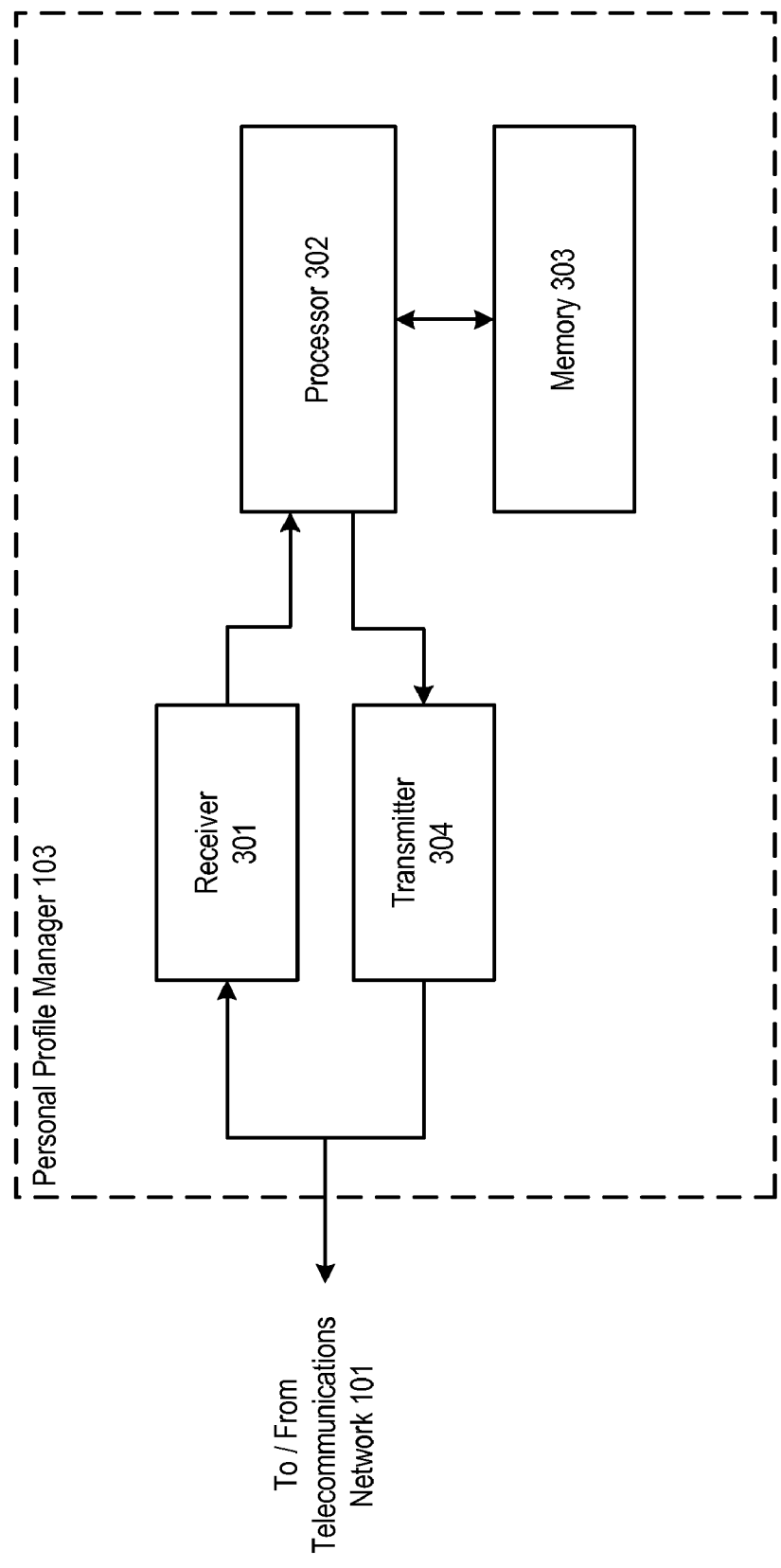
FIG. 3 depicts the salient components of personal profile manager 103.

FIG. 3 depicts the salient components of personal profile manager 103 in accordance with the illustrative embodiment of the present invention. Manager 103 comprises receiver 301, processor 302, memory 303, and transmitter 304, interconnected as shown.

Receiver 301 receives signals from other nodes (e.g., database server 102-*m*, call processing server 104, telecommunications endpoint 105-*n*, etc.) via network 101 and forwards the information encoded in the signals to processor 302, in well-known fashion. It will be clear to those skilled in the art, after reading this specification, how to make and use receiver 301.

Processor 302 is a general-purpose processor that is capable of receiving information from receiver 301, executing instructions stored in memory 303, reading data from and writing data into memory 303, executing the tasks described below and with respect to FIGS. 4 through 6, and transmitting information to transmitter 304. In some alternative embodiments of the present invention, processor 302 might be a special-purpose processor. In either case, it will be clear to those skilled in the art, after reading this specification, how to make and use processor 302.

Memory 303 stores the instructions and data used by processor 302. Memory 303 might be any combination of dynamic random-access memory (RAM), flash memory, disk drive memory, and so forth. It will be clear to those skilled in the art, after reading this specification, how to make and use memory 303.

Transmitter 304 receives information from processor 302 and transmits signals that encode this information to other nodes (e.g., database server 102-*m*, telecommunications endpoint 105-*n*, etc.) via network 101, in well-known fashion. It will be clear to those skilled in the art, after reading this specification, how to make and use transmitter 304.

Figure 4:
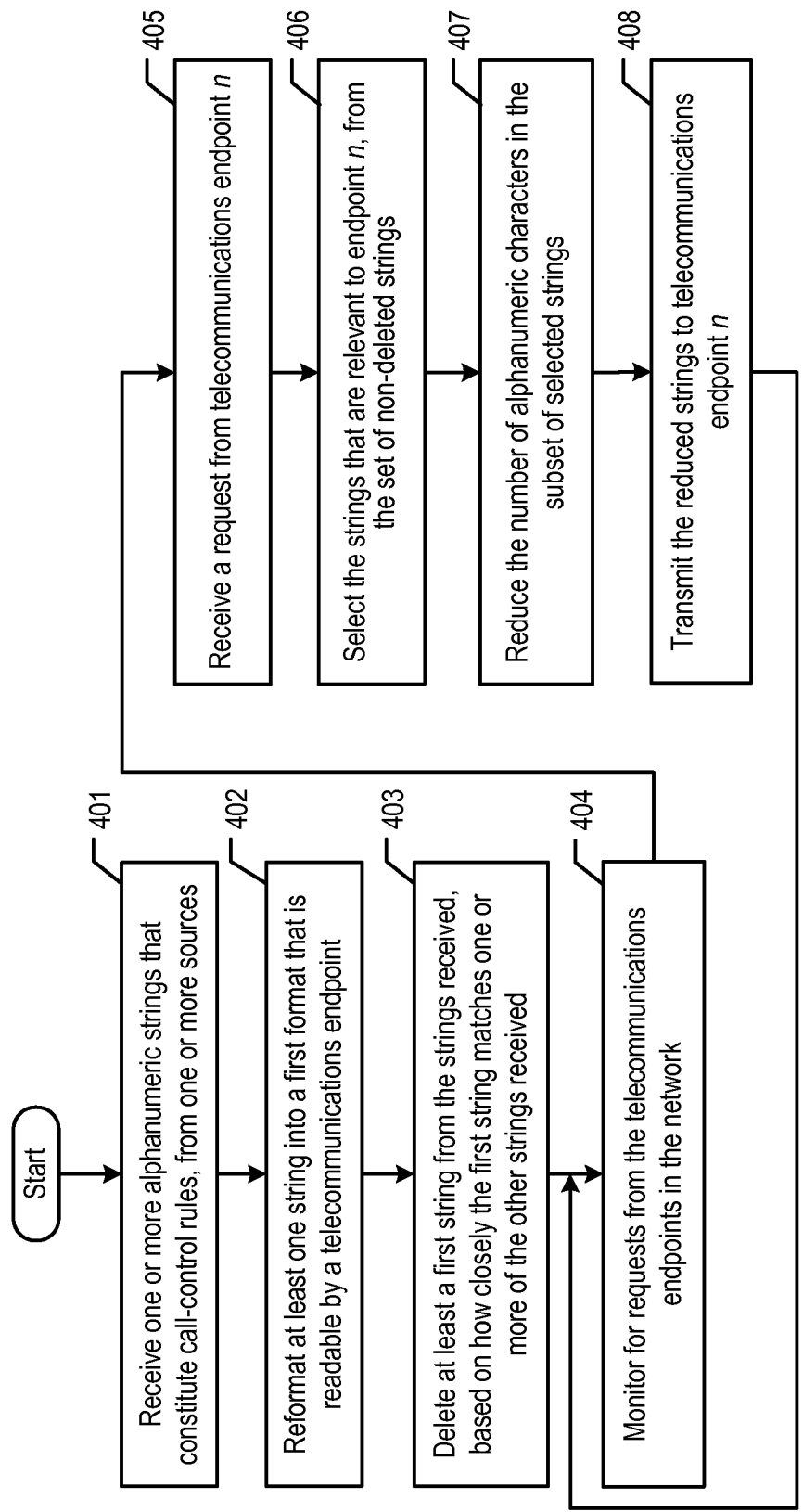
FIG. 4 depicts a flowchart diagram of the salient tasks performed by personal profile manager 103 in aggregating, reformatting, filtering, selecting, and reducing call-control strings, in accordance with the illustrative embodiment of the present invention.

FIG. 4 depicts a flowchart diagram of the salient tasks performed by personal profile manager 103 in aggregating, reformatting, filtering, selecting, and reducing call-control strings, in accordance with the illustrative embodiment of the present invention. As those who are skilled in the art will appreciate, some of the events that appear in FIG. 4 can occur in parallel or in a different order than that depicted.

At task 401, manager 103 receives one or more alphanumeric strings that constitute call-control rules (e.g., dialing plan rules, least-cost routing rules, etc.). Manager 103 receives the strings from one or more different sources, such as from database servers 102-1 through 102-M. Manager 103 receives the strings in the formats that are local to each source.

At task 402, manager 103 reformats one or more of the received strings into a format that is readable by one or more of telecommunications endpoints 105-1 through 105-N. In some embodiments, the new format is in the form of digitmap strings, as are known in the art. For example:

2xxx indicates that any four-digit number starting with "2" is permitted, and is used for extension-based dialing;

9Z1xxxxxxxxxx indicates that a dial tone is to be applied after a "9", followed by collecting a "1" followed by any 10 digits, and is used for dialing a long distance number from an office, where the user dials "9" to get an outside line; and 9Z011xxxxx+ indicates that at least five digits, but possibly more, are to be dialed after "011", and is used for dialing an international number.

Additional examples of string reformatting are provided in detail below and with respect to FIG. 5.

At task 403, manager 103 filters the strings by deleting one or more strings from the set of reformatted strings, based on how closely each string that is a candidate for deletion matches one or more of the other received strings. This "near-match" reduction eliminates strings that have become redundant, as the same or a similar string might have been received from two different sources (e.g., database servers 102-1 and 102-2, etc.).

Near-matched strings can occur, for example, where the call-control rules comprise rules for implementing least-cost routing based on the dialed digits. In least-cost routing, algorithms select a specific network resource upon matching a dialed-digit string. In accordance with the illustrative embodiment, call-processing server 104 performs the least-cost routing algorithm in telecommunications system 100; as a result, manager 103 need only provide a simplified dialing plan that can be used by endpoint 105-*n* to detect end-of-dialing or dialed numbers that do not match the dialing plan. Where manager 103 finds two or more similar strings that differ only in how least-cost routing information is specified, the manager can delete the superfluous string from what it provides to endpoint 105-*n*. In some alternative embodiments, however, manager 103 does, in fact, preserve the least-cost routing information in the string under consideration and passes the information along to endpoint 105-*n*. Least-costing routing is further described below and with respect to table 503 in FIG. 5.

At task 404, manager 103 monitors for call-control data requests from telecommunications endpoints 105-1 through 105-N. When an incoming request is being received, task execution proceeds to task 405.

At task 405, manager 103 receives a request from telecommunications endpoint 105-*n*. The request might indicate a particular endpoint, a particular user of an endpoint, or both. A request can be implicit, such as being in the form of a login from a user at a particular endpoint. Alternatively, the request can be explicit, indicating that a particular endpoint is requesting a dialing plan or other call-control rules.

At task 406, manager 103 selects the various strings of call-control rules that are specific to the requesting endpoint, from the set of non-deleted strings produced at task 403. In accordance with the illustrative embodiment, the selection of the rules is based on the requesting endpoint's location. For example, an endpoint in New York (i.e., at one point in a telecommunications network) might be provided with one set of call-control rules, while an endpoint in Denver (i.e., at another point in the telecommunications network) might be provided with a different set of call-control rules.

In some alternative embodiments, the selection of the rules is based on the identity of a user of endpoint 105-*n*. For example, the information that is part of a first subset of call-control rules might allow extension-based dialing for a first user of an endpoint in Miami to call other endpoints that are in a first geographic area (e.g., a company's office in Chicago, etc.), while the information that is part of a second subset of those rules might allow extension-based dialing for a second user of the same endpoint in Miami to call other endpoints that are in a second geographic area (e.g., the company's office in London, etc.).

At task 407, manager 103 reduces the number of strings in the subset of selected strings produced at task 406. In accordance with the illustrative embodiment, the reduction is based on the number of strings in the subset having exceeded a predetermined maximum amount. In some alternative embodiments, the reduction is based on the storage capacity of telecommunications endpoint 105-*n*. In still some other embodiments, the reduction is based on the terminal type of endpoint 105-*n* (e.g., deskset, cell phone, handheld computer, etc.).

An algorithm is then applied to the set, to get the number of final strings below the threshold value. The first example of an algorithm is a straight truncation, in which manager 103 removes all strings after the maximum allowable number of strings. The second example of an algorithm is referred to as a "vertical truncation," which is described in detail below and with respect to FIG. 6. As those who are skilled in the art will appreciate, other reduction techniques can be used. The result of the reduction is a set of reduced strings that is specific to the endpoint or user, or both.

At task 408, manager 103 transmits at least a portion of the set of reduced strings to telecommunications endpoint 105-*n*. In some embodiments, manager 103 also transmits some portion of the set of non-deleted strings (from task 403) or some portion of the set of reduced strings (from 407) to call-processing server 104. Task execution then returns to task 404.

Figure 5:
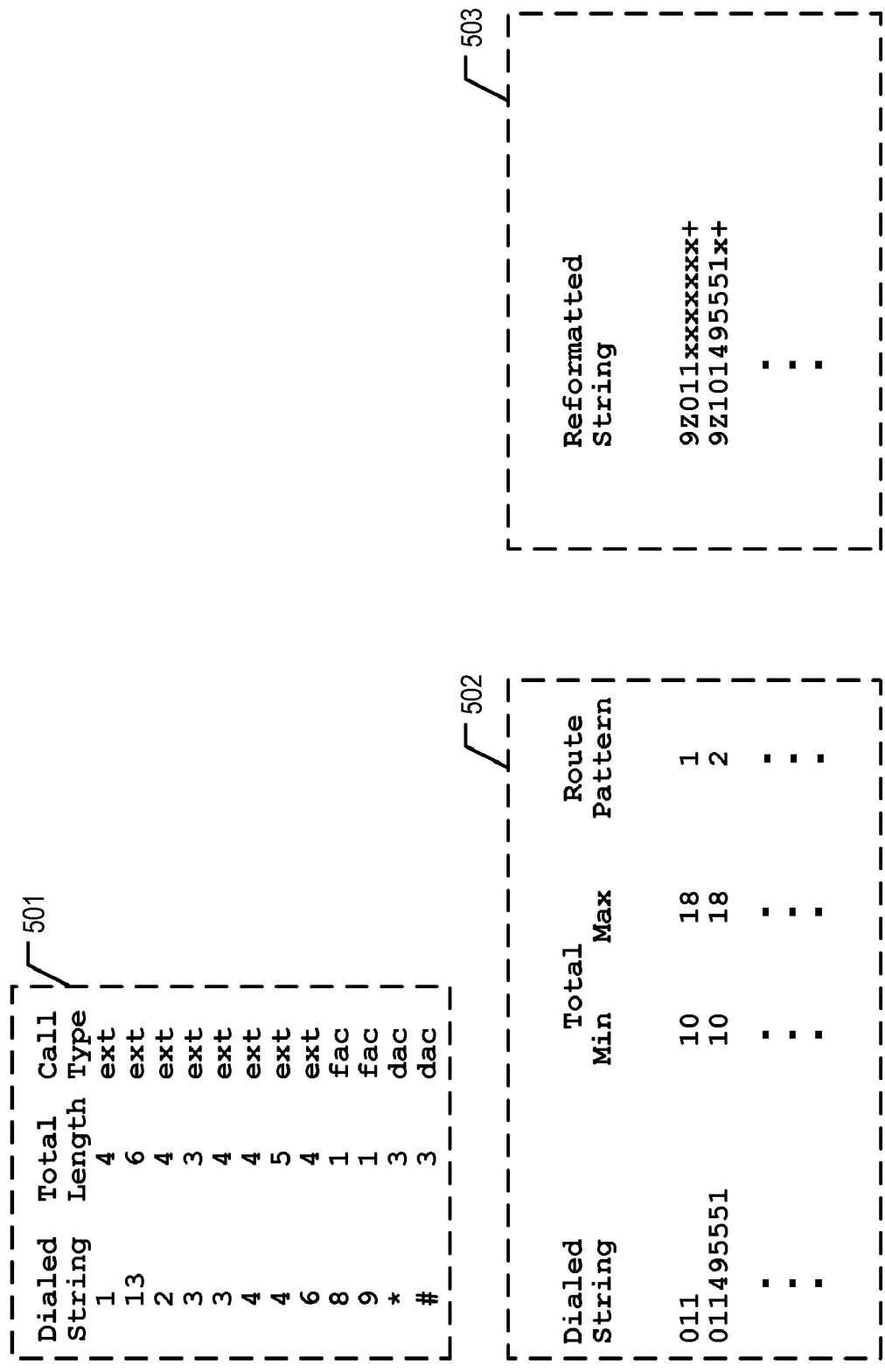
FIG. 5 depicts three illustrative tables of alphanumeric, call-control strings that are stored in memory 303 of personal profile manager 103.

FIG. 5 depicts three illustrative tables of call-control strings that are stored in memory 303. Table 501 represents a dialing plan analysis table in the database source's format, as received from one or more of database servers 102-1 through 102-M. Table 502 represents a route selection table, also in the source's format. Table 503 depicts the reformatted strings in the format in which the strings are provided to the client devices, such as endpoints 105-1 through 105-N. As those who are skilled in the art will appreciate, the strings can be represented in one or more different formats than those depicted.

The dialing plan information depicted in table 501 is received by manager 103 from one of its sources of call-control rules, as described earlier and with respect to task 401. The dialing plan information comprises one or more dialed strings, the total length of each string, and the call type, wherein ext denotes "extension-based dialing," fac denotes "feature access code," and dac denotes "dial access code." For example, the system permits three-digit and four-digit extensions that start with "3"; manager 103 would reformat this information into the dialing plan strings "3xx" and "3xxx" (in digitmap format). After additional processing, manager 103 transmits the dialing plan strings "3xx" and "3xxx" to endpoint 105-*n*. Later, when placing a call for its user, endpoint 105-*n* would use the dialing plan strings that it had received from manager 103 to determine that any dialed number starting with "3" requires that two or three more digits be entered by the endpoint's user.

The route selection information depicted in table 502 is also received by manager 103 from one of its sources of call-control rules, as described with respect to task 401. The route selection information comprises one or more dialed strings, the minimum and maximum total length of each string, and the route pattern that is used to identify the facilities that call-processing server 104 would use to route the call. Manager 103 processes the strings into a set of reformatted strings that are readable by one or more endpoints, such as the strings depicted in table 503, as described earlier and with respect to task 402. In reformatting each received string, manager 103 has added "9Z" at the beginning of each string because "9" is a feature access code (as indicated in table 501) for getting an outside line and "Z" is an indication that the endpoint is to add a second dial tone after its user dials the "9".

The following example illustrates least-cost routing, the concept of which was introduced earlier, as it pertains to manager 103 processing the call-control rules. A business location in the United States has an office in Frankfurt. Employees at this business location frequently place calls to international locations, including the office in Frankfurt, as well as to employees and customers in other countries. In the United States, international calls are dialed as "011+country code+telephone number." The business has private facilities, such as a Voice over IP network, between the United States and its Frankfurt office, so calls to that office should use the private facilities to minimize cost. The office in Frankfurt has a block of telephone numbers starting with "5551."

As part of the example, the depicted rows in table 502 reflect the call-control rules that would apply to international calling. As shown in the first row of table 502, general international calls are preceded with a dialed string of "011" and correspond to route pattern 1, as defined. Route pattern 1 specifies using conventional long-distance service from the PSTN service provider to call to international destinations other than Frankfurt. As shown in the second row of table 502, calls to the office in Frankfurt (with Germany country code "49") are preceded with a dialed string of "011495551" and correspond to route pattern 2, as defined. Route pattern 2 specifies trying a private facility first, then the PSTN service provider if no private facilities were available. Table 503 shows the reformatted strings (produced at task 402) that correspond to the two dialed strings in the example. Ultimately, the near-match reduction described with respect to task 403 would delete the string "9Z011495551x+" because the other string, "9Z011xxxxxxx+", is more general and already describes a rule that an endpoint should know about. The endpoint that eventually receives the appropriate subset of the reformatted strings in table 503 does not need to receive the least-cost routing information, as explained above and with respect to task 403.

Figure 6:
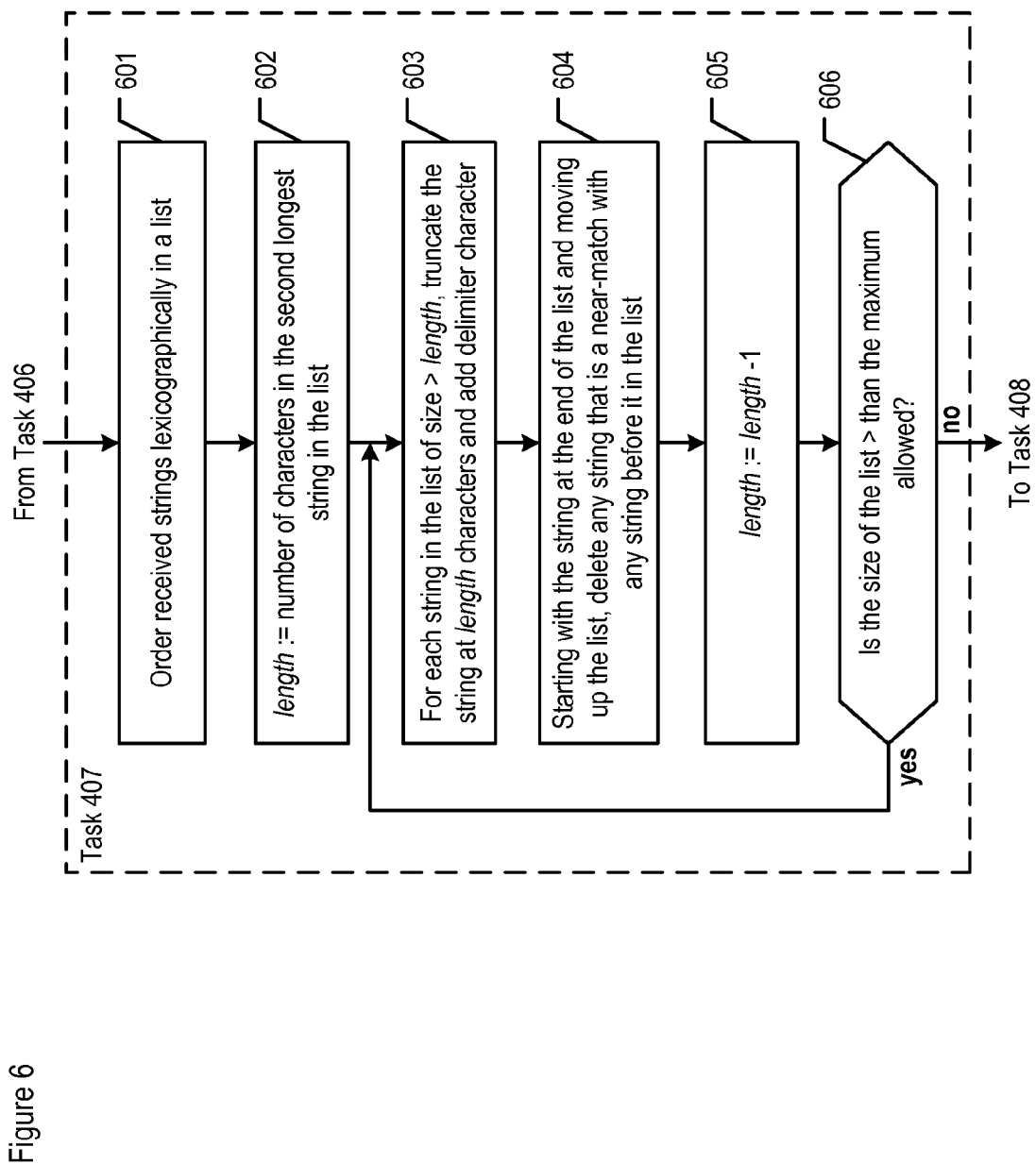
FIG. 6 depicts a flowchart of the salient subtasks performed by personal profile manager 103 as part of task 407, which is described with respect to FIG. 4.

FIG. 6 depicts a flowchart of the salient subtasks performed by personal profile manager 103 as part of task 407, in accordance with the illustrative embodiment of the present invention. The flowchart depicts the method of "vertical truncation." As those who are skilled in the art will appreciate, some of the events that appear in FIG. 6 can occur in parallel or in a different order than that depicted.

At task 601, manager 103 orders the subset of selected strings (from task 406) lexicographically in a list, in well-known fashion.

At task 602, manager 103 sets the variable referred to here as "length" equal to the number of characters in the second-longest string in the list.

At task 603, for each string in the list whose size is greater than length, manager 103 truncates the string at length characters and adds a delimiter character. For example, the character "+" can be used as the delimiter, to indicate the end of the string.

At task 604, starting with the string at the end of the list and moving towards the beginning of the list, manager 103 deletes any string that is a near-match (as described with respect to task 403) with any string before it in the list.

At task 605, manager 103 decrements the variable "length".

At task 606, manager 103 determines if the size of the list is still greater than the maximum number of strings allowed. If it is, task execution proceeds to task 603. If not, task execution proceeds to task 408.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   receiving, at a server, a first plurality of alphanumeric strings that constitute call-control rules;
   deleting, at the server, at least a first string from a second plurality of strings derived from the first plurality of alphanumeric strings based on a comparison between the first string and one or more other strings from the second plurality of strings, wherein the deletion results in a set of non-deleted strings;
   selecting at the server, from the set of non-deleted strings, a first subset of strings intended for a first telecommunications endpoint, wherein the selection is based on the location of the first telecommunications endpoint, and wherein the first subset of strings comprises dialing plan information; and
   transmitting, from the server, a first portion of the first subset of strings to the first telecommunications endpoint.

2. The method of claim 1 further comprising selecting a second subset of strings from the set of non-deleted strings intended for a second telecommunications endpoint, wherein the selection is based on the location of the second telecommunications endpoint.

3. The method of claim 1 further comprising reducing the number of alphanumeric characters in the first subset of strings.

4. The method of claim 3 wherein reducing the number of alphanumeric characters in the first subset of strings is based on a predetermined size limit having been exceeded.

5. The method of claim 4 wherein reducing the number of alphanumeric characters in the first subset of strings involves truncating a second string in the first subset of strings and adding a delimiter character that denotes the end of the second string.

6. The method of claim 4 wherein reducing the number of alphanumeric characters in the first subset of strings involves removing all strings from the first subset of strings beyond the predetermined size limit.

7. The method of claim 3 wherein reducing the number of alphanumeric characters in the first subset of strings is based on the storage capacity of the first telecommunications endpoint.

8. A method comprising:
   receiving, at a server, a first plurality of alphanumeric strings that constitute call-control rules;
   selecting at the server, from a second plurality of strings derived from the first plurality of alphanumeric strings, a first subset of multiple strings intended for a first telecommunications endpoint, wherein the selection is based on the location of the first telecommunications endpoint, and wherein the first subset of multiple strings comprises dialing plan information;
   truncating, at the server, each string that exceeds a predetermined size limit in the first subset of multiple strings, resulting in truncated strings;
   adding, to each of the truncated strings, a delimiter character that denotes the end of each of the truncated strings; and
   transmitting, from the server, a first portion of the first subset of strings to the first telecommunications endpoint.

9. The method of claim 8 wherein the truncation is based on the storage capacity of the first telecommunications endpoint.

10. The method of claim 8 further comprising reformatting at least one string from a first source and at least one string from a second source into a first format that is readable by the first telecommunications terminal, wherein the reformatting results in a set of reformatted strings.

11. The method of claim 10 further comprising deleting at least a second string from the set of reformatted strings, based on a comparison between the second string and one or more other strings from the set of reformatted strings, wherein the deletion results in the second plurality of strings.

12. The method of claim 8 wherein the selection is also based on the identity of a user of the first telecommunications terminal.

13. A method comprising:
   deleting, at the server, at least a first string from a plurality of alphanumeric strings that constitute call-control rules, based on a comparison between the first string and one or more other strings from the plurality of alphanumeric strings, wherein the deletion results in a set of non-deleted strings;
   when a first request from a first telecommunications endpoint is received, selecting at the server a first subset of strings from the set of non-deleted strings, wherein the selection is based on the location of the first telecommunications endpoint, and wherein the first subset of strings comprises dialing plan information;

truncating, at the server, each string that exceeds a predetermined size limit in the first subset of strings; and transmitting, from the server, a first portion of the first subset of strings to the first telecommunications endpoint.

14. The method of claim 13 further comprising:

when a second request from the first telecommunications endpoint is received that identifies a second endpoint user, selecting a second subset of strings from the set of non-deleted strings to transmit to the first telecommunications endpoint, wherein the selection of the second subset of strings is based on the location of the first telecommunications endpoint and on the second endpoint user;

wherein the first request identifies a first endpoint user; and wherein the selection of the first subset is also based on the first endpoint user.

15. The method of claim 14 wherein the first subset of strings comprises dialing plan information that is specific to the first user and the second subset of strings comprises dialing plan information that is specific to the second user.

16. The method of claim 15 wherein the dialing plan information of the first subset of strings allows extension-based dialing to call telecommunications terminals that are in a first geographic area and the dialing plan information of the second subset of strings allows extension-based dialing to call telecommunications terminals that are in a second geographic area.

17. The method of claim 13 wherein the call-control rules are received from at least a first source that maintains dialing plan information and a second source that maintains least-cost routing information.

18. The method of claim 17 wherein the first portion further comprises the least-cost routing information.

19. The method of claim 13 further comprising reducing the number of alphanumeric characters in the first subset of strings, based on the number of alphanumeric characters exceeding a predetermined size limit.

* * * * *